United States Patent Office 2,799,686
Patented July 16, 1957

2,799,686
ALPHA-BROMO-BETA(5-NITRO-2-THIENYL)-ACROLEIN

Gino Carrara, Milan, Italy, assignor to Lepetit S. p. A., Milan, Italy

No Drawing. Application June 21, 1954, Serial No. 438,360

1 Claim. (Cl. 260—332.3)

This invention relates to a new class of unsaturated aldehydes and derivatives thereof, and to methods for obtaining the same. More particularly, the compounds with which the invention is concerned may be represented by the following general formula

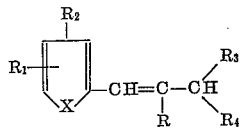

where X is a member of the class consisting of sulfur and oxygen; R is a member of the class consisting of hydrogen and halogen; $R_1$ and $R_2$ are the same or different and represent a member of the class consisting of hydrogen, halogen, lower alkyl radicals, lower alkoxy radicals and nitro group; $R_3$ and $R_4$ may be the same and represent lower alkoxy or acyloxy radicals, or different, and represent hydoxyl and a salified sulfonic group; or $R_3+R_4$ represents an oxygen atom.

I have discovered that the compounds of the present invention are particularly useful as antibacterial agents. Their activity has been checked against a wide number of infecting bacterial strains. The following bacteria were particularly sensitive to the activity of the compounds of the present invention: *Mycobacterium tuberculosis* H37Rv, *Micrococcus aureus*, *Streptococcus faecalis*, *Shigella sonnei*, *Klebsiella pneumoniae*, *Escherichia coli*, *Salmonella typhosa*, *Proteus vulgaris*, *Pseudomonas aeruginosa*, *Sarcina lutea*, *Bacillus cereus*, *Brucella abortus*, *Bacillus anthracis*, *Bacillus subtilis*, *Micrococcus flavus* and *Streptococcus haemolyticus*.

The compounds of the present invention corresponding to the general formula, in which R is halogen and $R_3+R_4$ is oxygen, are best prepared by a two-steps reaction which consists in reacting an aldehyde of formula

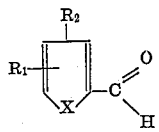

where X, $R_1$ and $R_2$ have the same significance as indicated above, with excess acetaldehyde at low temperature, in adding to the mixture a solution of potassium hydroxide in a lower aliphatic alcohol, while controlling the temperature below 20–25° C., and in refluxing the obtained mixture with acetic anhydride; hydrochloric acid is then added and the mixture is again refluxed; the obtained intermediate non-halogenated products are then halogenated by conventional methods in an appropriate solvent.

The compounds of the above general formula, wherein $R_3$ and $R_4$ are the same and represent lower aliphatic alkoxy or acyloxy radicals, are in turn prepared by reacting the compound of the general formula wherein $R_3+R_4$ is oxygen, respectively with a lower aliphatic alcohol or with a lower aliphatic acid anhydride under appropriate conditions.

The compounds of the above general formula, wherein $R_3+R_4$ is oxygen, reacted with an aqueous solution of an alkali bisulfite, give the corresponding compounds of the same general formula, wherein $R_3$ and $R_4$ are different, and represent hydroxyl and a salified sulfonic group.

The invention is illustrated by the following examples.

Example 1

α-BROMO-β-(5-NITRO-2-THIENYL)-ACROLEIN

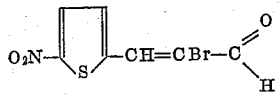

Into 10 g. 5-nitro-2-thiophenealdehyde previously cooled to —20°, 30 ml. acetaldehyde are dropped, the temperature being held below —15°. Thereafter 1 ml. of a 25% solution of potassium hydroxide in methyl alcohol is added and the mixture is allowed to rise to room temperature. After addition of 20 ml. acetic anhydride, the mixture is refluxed for 1 hr., then it is cooled, and after addition of 70 ml. 5% hydrochloric acid, the mixture is again refluxed for an additional hour. On cooling, the reaction mass separates light yellow needles, which are collected and recrystallized from water. Melting point 68–70°. Yield 9.5 g. (80%) of β-(5-nitro-2-thienyl)-acrolein.

A solution of 4.4 g. bromine in 50 ml. acetic acid is added dropwise, at a temperature of 15–20° C., to a solution of 5 g. β-(5-nitro-2-thienyl)-acrolein in 150 ml. acetic acid, then 3.8 g. anhydrous potassium carbonate are added and the mixture is refluxed for 0.5 hrs. On cooling to room temperature and pouring into 500 g. crushed ice, yellow needles of α-bromo-β-(5-nitro-2-thienyl)-acrolein separate, which are collected in vacuo and washed with water. Melting point 184–5°; yield 6.5 g. (90%).

2.62 g. α-bromo-β-(5-nitro-2-thienyl)-acrolein are reacted at room temperature with a saturated solution of 1.2 g. sodium bisulfite in water. The mixture is shaken mechanically for 0.5 hrs., and the formed light yellow crystals are collected on a vacuum filter and washed with a little amount of ice water. Yield 3.2 g. (89%) of sodium bisulfite addition compound of α-bromo-β-(5-nitro-2-thienyl)-acrolein.

Example 2

α-BROMO-β-(5-NITRO-2-FURYL)-ACROLEIN

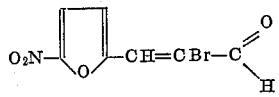

12 g. 5-nitro-2-furaldehyde are cautiously mixed with 45 ml. acetaldehyde, at a temperature of —25°, then 1.5 ml. of a 25% solution of potassium hydroxide in methyl alcohol are added and the mixture is allowed to stand until it reaches room temperature. After addition of 30 ml. acetic anhydride, the mixture is refluxed for 1 hr., then 105 ml. 5% hydrochloric acid are added and refluxing is continued for an additional hour. The yellow needles which separate on cooling are collected in vacuo and washed with ice water. Melting point 117–8°; yield 11 g. (77%) of β-(5-nitro-2-furyl)-acrolein.

Into a solution of 8.9 g. β-(5-nitro-2-furyl)-acrolein in 200 ml. acetic acid, a solution of 9 g. bromine in 100 ml. acetic acid is dropped in 15 minutes, then 3.5 g. potassium carbonate are added and the mixture is refluxed for 20 minutes, then it is cooled and poured into 500 ml. ice water. Yellow needles of α-bromo-β-(5-nitro-2-furyl)-acrolein separate, which are collected in vacuo and washed with ice water. Yield 11 g. (90%); melting point 191–2°.

A mixture of 4.8 g. α-bromo-β-(5-nitro-2-furyl)-acrolein and 15 ml. absolute alcohol is cooled to 0°, than a solution of 0.1 g. hydrogen chloride in 5 ml. ethyl alcohol is added. A spontaneous reaction starts, which is controlled by external cooling. After the reaction has subsided, the mixture is gently warmed on a water bath to 45–50°, then it is allowed to stand overnight. The mixture is then neutralized to litmus with potassium carbonate and extracted with ethyl ether. The ethyl ether extract is dried over anhydrous potassium carbonate and evaporated to dryness on a steam bath. The oily residue crystallizes after cooling. Yield 3.5 g. (55%).

I claim:

Alpha-bromo-beta-(5-nitro-2-thienyl)-acrolein.

References Cited in the file of this patent

UNITED STATES PATENTS

| | | |
|---|---|---|
| 2,319,481 | Stillman | May 18, 1943 |
| 2,502,114 | Witte | Mar. 28, 1950 |
| 2,649,461 | Hermann | Aug. 18, 1953 |
| 2,680,117 | Hermann | June 1, 1954 |

OTHER REFERENCES

Beilstein, vol. 7, page 359 (1925).
Beilstein, vol. 17, page 159 (1934).